United States Patent [19]

Ishikawa et al.

[11] 4,380,064
[45] Apr. 12, 1983

[54] DIGITAL AUDIO SIGNAL CONTROL SYSTEM FOR A TIMEDIVISION SWITCHING SYSTEM

[75] Inventors: Hiroshi Ishikawa, Yokohama; Takuhito Kojima, Yamato; Eiji Minamitani, Yokohama, all of Japan

[73] Assignee: Fujitsu Limited, Kawasaki, Japan

[21] Appl. No.: 196,569

[22] Filed: Oct. 14, 1980

[30] Foreign Application Priority Data

Oct. 17, 1979 [JP] Japan ................................. 54-134484

[51] Int. Cl.$^3$ .............................................. H04Q 11/04
[52] U.S. Cl. ....................................... 370/63; 370/59; 370/110.2
[58] Field of Search ................... 370/63, 59, 58, 110.1, 370/110.2

[56] References Cited

U.S. PATENT DOCUMENTS 4,101,737  7/1978  Philip ..................................... 370/63
4,205,203  5/1980  Mehta et al. ........................ 370/110.2
4,300,230  11/1981 Philip et al. ............................ 370/63

Primary Examiner—Douglas W. Olms
Attorney, Agent, or Firm—Staas & Halsey

[57] ABSTRACT

A digital pad switch inserted in each highway of a time-division speech network in which there are disposed on the backward side of the speech network time switches, each time switch reading out speech information from a speech memory in the order of the memory cell address, assigning a memory cell address by the output from a channel counter. The digital pad switch is arranged so that it may send out, under the control of a common control unit, a selected converted input signal corresponding to an input signal from the input to the digital pad switch, the converted input signal respectively having been attenuated as compared the input signal by predetermined amounts and also sending out a converted input signal corresponding to a zero level signal regardless of the magnitude of the input signal.

When cutting off a speech path set up in the time-division speech network, the digital pad switch is controlled by the common control unit so that the digital pad switch sends out the zero level signal as a signal of the speech path passing through the digital pad switch, and after writing the zero level signal in the speech memory of the time switch on the backward side, the speech path is cut off.

A continuous tone signal passing through the time-division speech network is inputted into the digital pad switch. The digital pad switch is controlled by the common control unit to selectively send out the zero level signal for a desired period of time, thereby turning ON and OFF the tone signal. When sending out a howler tone, the amount of attenuation of the tone signal is decreased under the control of the common control unit in a stairstep manner. When testing a multi-frequency signal receiver, a multi-frequency signal transmitter and the multi-frequency signal receiver under test are connected to the backward and the forward side of the time-division speech network, respectively. A path is set up between them and then a signal on the path is attenuated variously by the digital pad switch in order to vary the level of the input signal to the multi-frequency signal receiver.

Thus, the present invention permits efficient use of the digital pad switch.

17 Claims, 3 Drawing Figures

DIGITAL AUDIO SIGNAL CONTROL SYSTEM FOR A TIMEDIVISION SWITCHING SYSTEM

BACKGROUND OF THE INVENTION

1. Field of the Invention

The present invention relates to a signal control system, and more particularly to a control system for a digital signal on a speech path in a time-division switching system.

2. Description of the Prior Art

In a space-division switching system handling an analog signal, even if an originating terminal is connected, via a digital transmission line, with a terminating terminal, it is required that a loss for retaining moderate speech quality be imparted by the terminal equipment to a repeater line. In a time-division switching system handling a digital signal, when a digital transmission line is used, no terminating terminal equipment is needed because the originating terminal can be interfaced directly with the digital transmission line. Accordingly, it is necessary to connect a loss pad switch for varying the loss to the digital transmission line in the originating terminal; because the loss to be inserted differs with the kinds of connections and terminating terminals, and thus various insertion losses (for example, 3 dB, 5 dB, 6 dB, etc) must be created. A digital pad for inserting these different losses has been proposed which is to be inserted into a highway.

In the time-division switching system, switch components can be made of semiconductor parts to permit rapid switching; therefore, connection, disconnection, switching and like operations for the speech path can be performed instantaneously by directly controlling a time-division speech network formed of electronic parts such as memories, gates and so forth.

When a time switch with a random write-sequential read arrangement is included on the backward side of the time-division speech network, the setting and disconnection of the speech path takes place in the manner described below.

When using time switch, the speech path is set up by reading out data written in a time switch control memory by a common control unit, writing speech information in the speech memory using the read-out data as a write address, and reading out the written speech information from the speech memory onto the backward highway using the output data from a channel counter as a read address. The disconnection of the speech path is performed by erasing the address data written in the time switch control memory. In short, when the address data in the time switch control memory is erased, speech information is no longer written into the speech memory and the transmission from speech memory is stopped, thus cutting off the speech path. In this case, the read addresses from the channel counter continue, thus, continuing the read out of speech information from the speech memory to the forward highway.

In the above case, the cutting off of the speech path is accompanied by the following problems:

After cutting off of the speech path, new speech information is not written into the speech memory of the time switch at the address assigned to the speech path, so that the speech information stored before cutting off the speech path remains in the speech memory. As a result, constant data (the residual data) are continuously sent out on a channel of the output side. When the data are decoded by a decoding circuit, a DC current having a level dependent on the residual data is provided at the output of the decoding circuit.

Accordingly, when connecting to the aforesaid speech network a signal processing unit susceptible to interference by the DC signal in the output of the decoding circuit, for example, a conference trunk, there must be provided means for cutting off the DC signal for the following reason. In the conference trunk of the time-division switching system, digital speech signals inputted from a plurality of input terminals are decoded by a decoding circuit into analog signals and then mixed together, thereafter the mixed signal is distributed to subscribers taking part in a conference; therefore, a DC signal with a high level may sometimes be applied to the conference trunk by the decoding circuit having an input terminal connected to a disconnected speech path, thus interfering with the conferenced speech.

Further, when the originating terminal is connected with a digital repeater line, the residual data are continuously sent out to the terminating terminal without being decoded, so that according to the pattern of the residual data, for example, when the data are all "0," clock pulses cannot be reconstructed in the terminating terminal, thus making signal transmission impossible.

Moreover, when changing the connection of a speech path of the speech network, a signal generated by the residual data appears in the signal to be newly transmitted and according to the pattern of the residual data, a high degree of discontinuity is introduced into the signal and the discontinuity generating noise.

The above problems are created when the time switch of the random write-sequential read construction is included on the backward side of the time-division speech network.

In the prior art, a signalling tone is obtained by a continuous signal tone being intermittently applied, for example, a busy tone is generated by ON-OFF control of a continuous signal source, however, this ON-OFF control can be achieved in the time-division speech network. When the time-division speech network interrupts the signal tone, however, exactly the same problems are created as described above.

In the transmission of a howler tone, it is general practice in the prior art to connect a howler trunk to a telephone set having a permanent call and gradually increase the sending level of the howler tone in the howler trunk. To perform this, each howler trunk must be equipped with means for gradually increasing the sending level, and it is impossible to simultaneously send out a howler tone from one howler trunk to a plurality of telephone sets since the howler sending operation starts at a particular moment for each telephone set.

Furthermore, a multi-frequency signal receiver correctly receives only when the signal receiving level lies within a certain range, and to ensure correct reception the receiver is tested by sending thereto signals having different receiving levels. In the time-division switching system, in order to vary the receiving level of the multi-frequency signal, it is customary in the prior art to connect a multi-frequency signal transmitter via a time-division speech network to a piece of test equipment and to connect the test equipment via the time-division speech network to the multi-frequency signal receiver under test. Thus forming a test circuit from the multi-frequency transmitter to the multi-frequency receiver under test, wherein various losses are inserted by the test equipment. Accordingly, such special test equipment as mentioned above is required in the prior art.

As described above, the prior art has the disadvantage that signal sending level changing means must be included in a tone sending device (for example, a howler trunk) or in the multi-frequency signal receiver test equipment so that a tone signal of varying sending level can be obtained.

SUMMARY OF THE INVENTION

It is an object of the present invention to solve the above-mentioned problems created by cutting off the speech path with an improved digital pad switch which is included in each highway to one of the time switches. The time switches are included on the backward side of a time-division speech network, and the time switches each read out speech information from the speech memory in the order of the memory address assigned by the output from a channel counter.

Another object of the present invention is to solve, through utilization of the digital pad switch, the above-mentioned problems in the ON-OFF control of a tone signal in the time-division speech network.

Another object of the present invention is to permit the transmission of a howler tone from one signal tone source having a constant signal level to a plurality of telephone sets in the time-division speech network.

Another object of the present invention is to permit the testing of a multi-frequency signal receiver by varying the received signal level without using special test equipment by applying a variable attenuation to the multi-frequency signal.

Yet another object of the present invention is to permit efficient use of the digital pad switch.

The present invention will be more readily understood by reference to the following detailed description, when considered in conjunction with the accompanying drawing.

DESCRIPTION OF THE PREFERRED EMBODIMENTS

Figure 1:
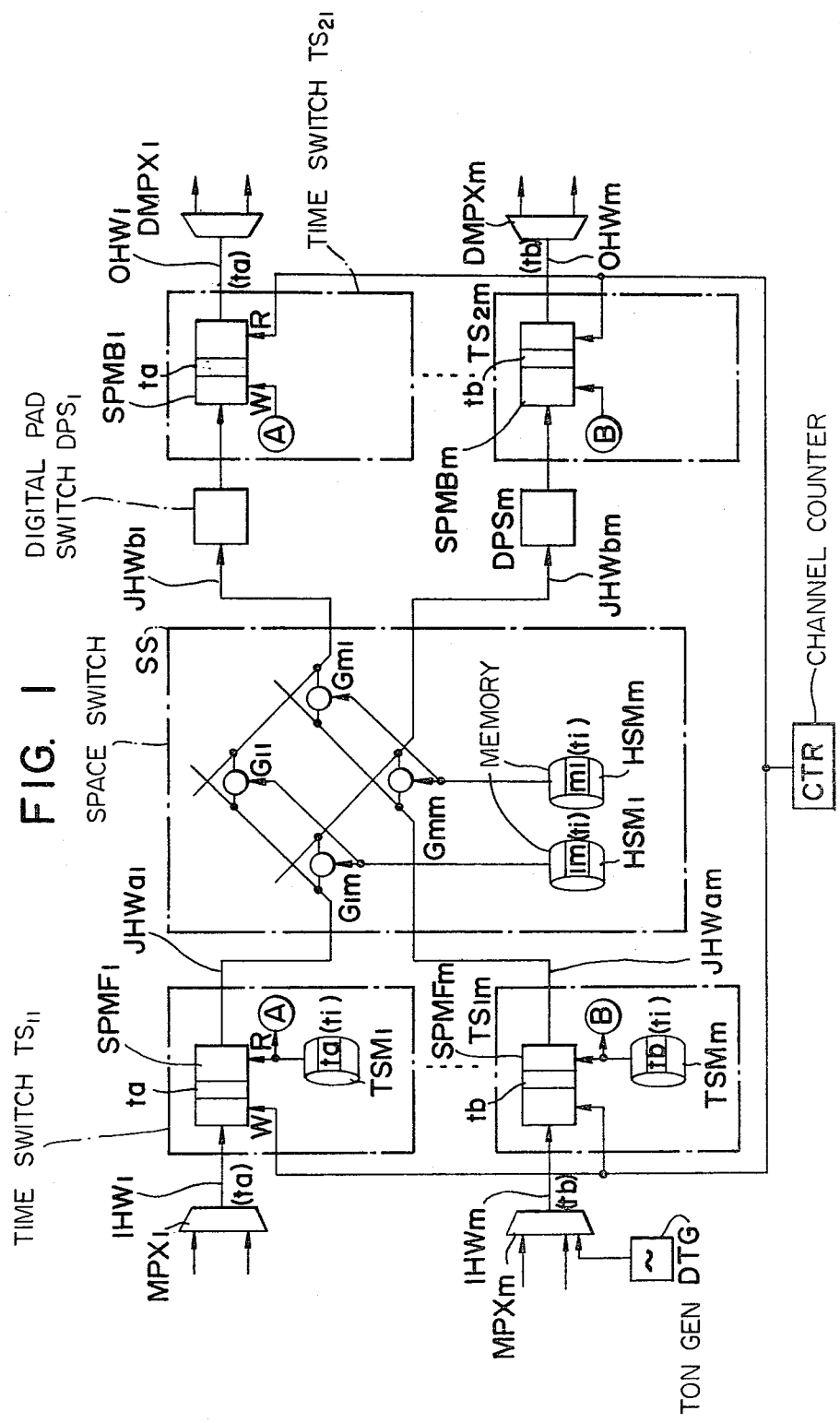
FIG. 1 is a connection diagram illustrating an embodiment of the present invention.

FIG. 1 illustrates an example of a time-division speech network according to the present invention. In FIG. 1, reference characters $IHW_1$ to $IHW_m$ indicate incoming highways, $TS_{11}$ to $TS_{1m}$ designate primary time switches, SS identifies a space switch and $TS_{21}$ to $TS_{2m}$ denote secondary time switches provided on backward side of the speech network. The speech network shown in FIG. 1 is a twin control type speech network generally referred to as the T-S-T type, but the present invention is not limited specifically to this system. Reference characters $SPMF_1$ to $SPMF_m$ represent speech memories of the primary time switches $TS_{11}$ to $TS_{1m}$; $TSM_1$ to $TSM_m$ show time switch control memories; CTR refers to a channel counter; $HSM_1$ to $HSM_m$ indicate highway control memories; $SPMB_1$ to $SPMB_m$ designate speech memories of the secondary time switches $TS_{21}$ to $TS_{2m}$; $OHW_1$ to $OHW_m$ identify outgoing highways; $JHW_{al}$ to $JHW_{am}$ and $JHW_{bl}$ to $JHW_{bm}$ denote junctor highways; and $DPS_1$ to $DPS_m$ represent digital pad switches.

The channel counter CTR is a circulating counter which resets its count output to "0" when finished counting the number of synchronizing clock pulses equal to the number of time slots allotted to one frame of each of the highways $IHW_1$ to $IHW_m$ and $OHW_1$ to $OHW_m$. The count output from the channel counter CTR is used as a write address for the speech memories $SPMF_1$ to $SPMF_m$ of the primary time switches $TS_{11}$ to $TS_{1m}$ and as a read address for the speech memories $SPMB_1$ to $SPMB_m$ of the secondary time switches $TS_{21}$ to $TS_{2m}$.

A description will be given of the principles of the speech network of FIG. 1, when information on a time slot $t_a$ of the incoming highway $IHW_1$ is sent to a time slot $t_b$ of the outgoing highway $OHW_m$ and information on a time slot $t_b$ of the incoming highway $IHW_m$ is set out to a time slot $t_a$ of the outgoing highway $OHW_1$.

The time switch control memory $TSM_1$ of the primary time switch $TS_{11}$ is a circulating memory which has the same number of memory cells and thus memory cell addresses as the number of time slots in one frame of the junctor highway $JHW_{al}$ and is arranged so that the memory is accessed in the sequential order of the address in order to read out its stored contents. In each addressable memory cell is written address information for the speech memory $SPMF_1$ by a common control unit (not shown) of the speech network.

The speech memory $SPMF_1$ is accessed in the order of the address, using the output from the channel counter CTR as a write address, by which input information from the incoming highway $IHW_1$ is written in the memory $SPMF_1$ in the order of address, that is, sequentially. In this case, in the time slot $t_a$ of the incoming highway $IHW_1$, the number of the time slot $t_a$ is equal to the address assigned by the channel counter CTR, and the information on the time slot $t_a$ is written into the address $t_a$.

In this case, since $t_a$ is written as address information by the common control unit (not shown) in the area to be addressed in a time slot $t_i$ ($a \neq i$) of the time switch control memory $TSM_1$, the address information $t_a$ is read out in the time slot $t_i$, by which the address $t_a$ of the speech memory $SPMF_1$ is accessed to read out therefrom information onto the junctor highway $JHW_{al}$. That is, the information on the time slot $t_a$ of the incoming highway $IHW_1$ is provided on the time slot $t_i$ of the junctor highway $JHW_{al}$.

In the space switch SS there are provided the highway control memories $HSM_1$ to $HSM_m$ respectively corresponding to the incoming junctor highways $JHW_{al}$ to $JHW_{am}$. The space memory is identical in construction with the time switch control memory $TSM_1$, but in this memory data is written by the common control unit which is used for assigning one of each gates $G_{11}$ to $G_{1m}$ and one of the gates $G_{m1}$ to $G_{mm}$ to respectively connect the incoming junctor highways $JHW_{al}$ to $JHW_{am}$ with the outgoing highways $JHW_{bl}$ to $JHW_{bm}$.

In this case, since information for assigning the connection of the gate $G_{1m}$ is written in the address of the highway control memory $HSM_1$ for the incoming junctor highway $JHW_{al}$ is to be read out in the time slot $t_i$, the gate $G_{1m}$ is assigned to conduct during the time slot $t_i$. Through the gate $G_{1m}$ the information on the incoming junctor highway $JHW_{al}$ in the time slot $t_i$ is passed on to the outgoing junctor highway $JHW_{bm}$ in the same time slot $t_i$.

Also, the information on the incoming highway $IHW_m$ in the time slot $t_b$ is similarly provided on the outgoing junctor highway $JHW_{b1}$ in the time slot $t_i$.

To the junctor highways $JHW_{b1}$ to $JHW_{bm}$ are respectively connected the digital pad switches $DPS_1$ to $DPS_m$, which will be described later.

The outputs from the time switch control memories $TSM_1$ to $TSM_m$ of the primary time switches $TS_{11}$ to $TS_{1m}$ (address information) are respectively applied as write address information to the speech memories $SPMB_1$ to $SPMB_m$ of the secondary time switches $TS_{21}$ to $TS_{2m}$ to the speech memories $SPMB_1$ to $SPMB_m$. Accordingly, information on the time slot $t_b$ of the incoming highway $IHW_m$ is provided on the time slot $t_i$ of the junctor highway $JHW_{b1}$ and then to the speech memory $SPMB_1$ of the secondary time switch $TS_{21}$. The address information ($t_a$) read out from the time switch control memory $TSM_1$ in the time slot $t_i$ is also applied as a write address to the speech memory $SPMB_1$ to write therein information on the time slot $t_i$ of the junctor highway $JHW_{b1}$ at the address $t_a$ which is read out in the time slot $t_a$ during a sequential read.

By the output information from the channel counter CTR in the time slot $t_a$, the information written in the address $t_a$ of the speech memory $SPMB_1$ is read out and outputted on the time slot $t_a$ of the outgoing highway $OHW_1$.

In this way, the information in the time slot $t_b$ of the incoming highway $IHW_m$ is outputted on the time slot $t_a$ of the outgoing highway $OHW_1$. Likewise, the information on the time slot $t_a$ of the incoming highway $IHW_1$ is outputted on the time slot $t_b$ of the outgoing highway $OHW_m$. Thus, speech paths are set up as described above, performing desired switching connections.

In FIG. 1, reference characters $MPX_1$ to $MPX_m$ indicate multiplexers for multiplexing information; and $DMPX_1$ to $DMPX_m$ designate demultiplexers for demultiplexing information. These multiplexers and demultiplexers are included as required.

When cutting off the speech paths set up as described above, the address information $t_a$ and $t_b$ written in the memory cell of the time switch control memories $TSM_1$ and $TSM_m$ to be read out in the time slot $t_i$ are erased under the control of the aforementioned common control unit (not shown). As a result, in the time slot $t_i$ the write addresses $t_a$ and $t_b$ for the speech memories $SPMB_1$ and $SPBM_m$ of the secondary time switches $TS_{21}$ and $TS_{2m}$ are not assigned and consequently no new speech information is written in the speech memories. Accordingly, when the addresses $t_a$ and $t_b$ are assigned as read addresses by the output from the channel counter CTR, new speech information is not read out onto the outgoing highways $OHW_1$ and $OHW_m$, thus cutting off the speech paths. Even after cutting off the speech paths, however, the speech information remaining in the addresses $t_a$ and $t_b$ of the speech memories $SPMB_1$ and $SPMB_m$ continues to be read out by the channel counter CTR onto the outgoing highways $OHW_1$ and $OHW_m$ in the time slots $t_a$ and $t_b$. This poses the problems described previously.

Figure 2:
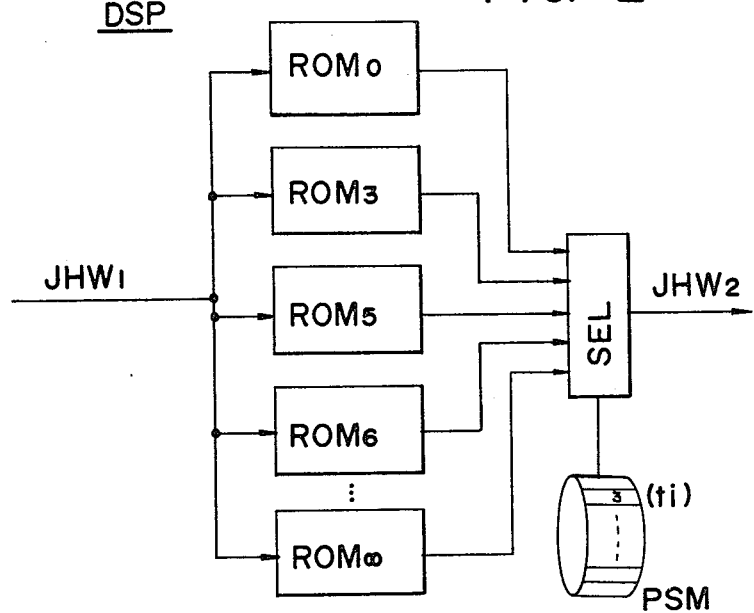
FIG. 2 is a block diagram illustrating an embodiment of a digital pad switch for use in the embodiment of FIG. 1.

Next, a description will be given of the digital pad switches $DPS_1$ to $DPS_m$ employed in the embodiment of FIG. 1. FIG. 2 illustrates an example of the construction of the digital pad switch, which attenuates, by a specified amount, time-division multiplex information inputted from the junctor highway $JHW_1$ and provides the attenuated information on the junctor highway $JHW_2$.

In FIG. 2, reference characters $ROM_0$, $ROM_3$, $ROM_5$, $ROM_6$... $ROM_\infty$ indicate read only memories; SEL designates a selector; and PSM identifies a pad switch control memory.

The input from the junctor highway $JHW_1$ is time-division multiplex information that, for example, is an 8-bit PCM (Pulse Coded Modulation) code included in each time slot. Each of the read only memories $ROM_0$, $ROM_3$, $ROM_5$, $ROM_6$... $ROM_\infty$ has an address corresponding to each one of the PCM codes. In the read only memory $ROM_0$ is prestored the same PCM code as the input PCM code. In the read only memories $ROM_3$, $ROM_5$ and $ROM_6$ are respectively prestored converted PCM codes that represent the input PCM code attenuated by 3 dB, 5 dB and 6 dB, respectively. In the read only memory $ROM_\infty$ provided according to the present invention, a PCM code (for example, 01111111) corresponding to a zero level pattern is prestored in all addresses corresponding to the input PCM code.

For example, when the 8-bit PCM code is inputted from the junctor highway $JHW_1$ in the time slot $t_i$, the same PCM code as the input PCM code, the converted PCM codes, that is the PCM codes where the input PCM code has been attenuated by 3 dB, 5 dB and 6 dB, respectively, and the converted PCM code corresponding to the zero level pattern are read out of the memory cells of the read only memories $ROM_0$, $ROM_3$, $ROM_5$, $ROM_6$... $ROM_\infty$ into the selector SEL using the PCM code as the read address.

The pad switch control memory PSM is identical in construction with the aforesaid time switch control memory $TSM_1$ and, in the memory cell corresponding to a particular address to be read out in each time slot, there is written, by the common control unit (not shown), information on the attenuation of the information on each time slot. Assuming that information corresponding to 3 dB ($ROM_3$) has been written into the memory cell corresponding to a particular address to be read out in the time slot $t_i$, this information is read out in the time slot $t_i$ and applied to the selector SEL which selects and sends out the output from the read only memory $ROM_3$, corresponding to a 3 dB pad, to the junctor highway $JHW_2$. Accordingly, speech information which is inputted to the junctor highway $JHW_1$ in the time slot $t_i$ is attenuated 3 dB and provided on the junctor highway $JHW_2$. In a similar manner, information inputted to the junctor highway $JHW_1$ can be attenuated 0 dB, 5 dB and 6 dB. Likewise, by writing information for an attenuation of $\infty$ into the memory cell of the pad switch control memory PSM which is read out in the time slot $t_i$, and selecting the output from the read only memory $ROM_\infty$, the fixed PCM code of the aforesaid zero level can be provided on the junctor highway $JHW_2$ regardless of the speech information inputted to the junctor highway $JHW_1$.

Now, let it be assumed that speech paths are set up as described previously with regard to FIG. 1. In the cutting off of the speech paths, according to the present invention, the information for the attenuation of $\infty$ is written into those memory cells of the pad switch control memories of the digital pad switches $DPS_1$ and $DPS_m$ which are read out in the time slot $t_i$. As a result, for example, in a period of one frame, zero level PCM codes derived from the digital pad switches $DPS_1$ and $DPS_m$ are written as speech information into the memory cells addressed by the addresses $t_a$ and $t_b$ of the speech memories $SPMB_1$ and $SPMB_m$ of the secondary time switches $TS_{21}$ and $TS_{2m}$. Then, the information $t_a$ and $t_b$ are erased which have been written in the memory cells of the time switch control memories $TSM_1$ and $TSM_m$ used for setting up the speech paths, that is, the memory cells which are accessed in the time slot $t_i$. The result is that the speech paths are cut off, but because of the digital pad switch the zero level PCM codes written into the memory cells addressed by the addresses $t_a$ and $t_b$ of the speech memories $SPMB_1$ and $SPMB_m$ are applied to the time slots $t_a$ and $t_b$ of the outgoing highways $OHW_1$ and $OHW_m$ without interruption, thus preventing the problems described previously.

Signal control, for example, the ON-OFF control of a continuous tone signal can be achieved in the following manner. In FIG. 1, a continuous digital tone generator DTG connected to the input end of the time-division speech network is input via the multiplexer $MPX_m$ into a suitable time slot of the incoming highway $IHW_m$, for example, the aforesaid time slot $t_b$, by which such switching as described above is performed, and the output from the digital tone generator DTG can be provided on the time slot $t_a$ of the outgoing highway $OHW_1$. In this case, the continuous tone signal from the digital tone generator DTG is sent out via the junctor highway $JHW_{b1}$ and the digital pad switch $DPS_1$ of the construction shown in FIG. 2. Accordingly, the ON-OFF control of the tone signal can be achieved by controlling the pad switch control memory (PSM) of the digital pad switch DPS1. That is, by the common control unit (not shown), in the tone signal sending-out period select data, corresponding to the read only memory $ROM_0$ with no attenuation, is written in the memory cell of the pad switch control memory PSM which is read out in the time slot, for example, TI, thereby passing the tone signal through the digital pad switch DPS1 without attentuation. In the tone signal interruption period, select data, corresponding to the read only memory ROM, is written in the memory cell in order to send out the PCM code corresponding to the zero level, thereby interrupting the tone signal. By repeating this process, the on-off control of the tone signal is performed. In a case where it is necessary to attenuate the tone signal, then the tone signal is transmitted via a read only memory wherein it is attenuated as required.

Next, a description will be given of sending out of the howler tone.

In this case, the digital tone signal generator fn FIG. 1 comprises a howler tone generator which sends out a howler tone (the digital tone signal) of a constant level. Let it be assumed that the receiving side of a telephone set to which the howler tone is applied corresponds to the time slot TA of the outgoing highway $OHW_1$. By performing such switching connection as described previously, the howler tone generator (DTG) is connected via the digital pad switch DPS1 to the abovesaid telephone set (the time slot TA of the outgoing highway $OHW_1$). When making the howler tone gradually louder, loss select information of the pad switch control memory (PSM) is sequentially changed under the control of software in accordance with a sequence prepared in the common control unit (not shown) for decreasing the insertion loss in a stairstep manner (i.e., changing the losses inserted by the digital pad switch $DPS_1$ in a decreasing order), by which the level of signal received by the telephone set is gradually increased in a stairstep manner, achieving the object.

In the case of sending out the howler tone, no sending level adjustment means is required in the howler tone generator and it is possible to send from one howler tone generator of a constant level to a plurality of telephone sets howler tones which independently gradually increase their levels and start form different moments. This permits simplification of the howler tone sending means.

The multi-frequency signal receiver and a push-button signal receiver are required to correctly receive and analyze only an input multi-frequency signal of a level lying within a constant range. According to the present invention, a multi-frequency transmitter is connected to the forward side of the time-division speech network and is used as the digital tone signal generator DTG shown in FIG. 1, and the multi-frequency receiver under test is connected to the backward side of the time-division speech network and via the time-division speech network with the multi-frequency transmitter. The common control unit (not shown) performs control for varying the attenuation inserted by the digital pad switch into the speech path set up from the transmitter to the receiver, whereby the level of the input signal to the multi-frequency signal receiver under test can be varied, and accordingly a sensitivity test of the receiver can be conducted. Thus, there is no need to use a special test equipment which has a function of applying a variable attenuation to the multi-frequency signal.

With the present invention, it is also possible to generate and send out a variety of signal tones with a variety of levels by attenuating the tone signal from the continuous digital tone signal generator by certain amounts with timing under the control of the common control unit.

The present invention is also applicable to the control of the DC output (decoder output) level of an idle signal.

Figure 3:
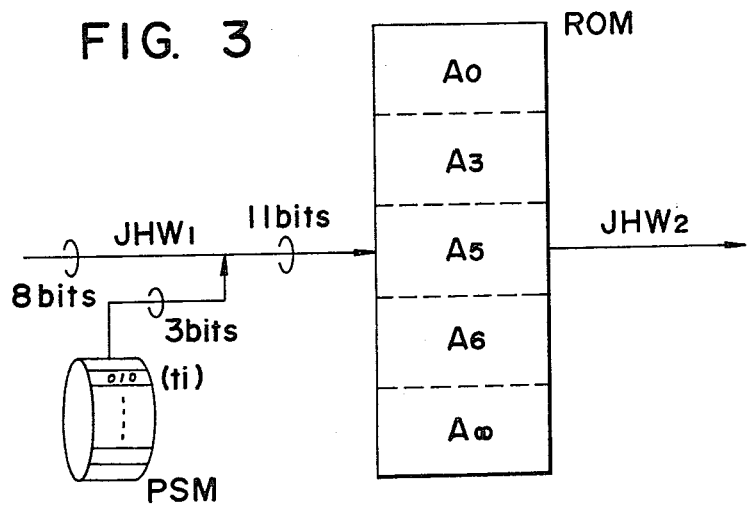
FIG. 3 is a block diagram illustrating another embodiment of the digital pad switch.

FIG. 3 illustrates another example of the digital pad switch. In FIG. 3, reference character ROM indicates a read only memory, which has areas $A_0$, $A_3$, $A_5$, $A_6$ and $A_\infty$. The other reference characters identify the same parts as those in FIG. 2. In this case, the areas $A_0$, $A_3$, $A_5$, $A_6$ and $A_\infty$ are addressed by 3-bit information and each area has memory cell addresses corresponding to, for example, an 8-bit PCM code as is the case with the read only memory $ROM_0$ in FIG. 2. In the area $A_0$ there is prestored in each memory cell the same PCM code as the input PCM code corresponding to the memory cell address. In the areas $A_3$, $A_5$ and $A_6$ there are similarly prestored converted PCM codes so that the input PCM code is attenuated 3 dB, 5 dB and 6 dB, respectively. In the area $A_\infty$ a PCM code (for example, 01111111) corresponding to a zero level pattern is prestored in all addresses corresponding to the input PCM code.

In the case where information inputted from the junctor highway $JHW_1$ in the time slot $t_i$ is attenuated 3 dB, three bits, for example, 010, for assigning the area $A_3$ is written by the common control unit (not shown) in the memory of the pad switch control memory PSM which is read out in the time slot $t_i$. In the time slot $t_i$, the 3-bit information read out from the pad switch control memory PSM for the address of the area $A_3$ and the 8-bit PCM code from the incoming junctor highway $JHW_1$ are applied as address information for reading out the read only memory ROM. That is, a total of 11 bits are transferred to the read only memory ROM, from which is read out on the junctor highway $JHW_2$ information from the memory cell addressed by the 8-bit PCM code from the area addressed by the three bits, that is, the 8-bit converted PCM code that corresponds to the inputted 8-bit PCM code attenuated by 3 dB. In this way, by writing three bits corresponding to each of the areas $A_0$, $A_3$, $A_5$, $A_6$ and $A_\infty$ of the read only memory ROM 5 into the memory cell corresponding to each time slot of the pad switch control memory PSM, information on each time slot of the junctor highway $JHW_1$ can be attenuated by a predetermined amount from zero attenuation to cutting off the speech path by sending out the zero level pattern information. As will be appreciated from the above, the digital pad switch of FIG. 3 has the same functions as the digital pad switch of FIG. 2.

The digital pad switch can be formed by read only memories, as shown in FIGS. 2 and 3, but is not limited specifically thereto and may also be other means which imparts loss to a speech by digital processing; namely, it is also possible to employ, for example, a variable digital pad switch comprises a digital multiplying system in which the input PCM code is multiplied in a digital multiplier by a coefficient for attenuating the input PCM code by a predetermined amount.

Numerous changes may be made in the above described examples and different embodiments of the invention may be made without departing from the spirit and scope of the invention. Therefore it is intended that all matter contained in the foregoing description and accompanying drawings shall be interpreted as illustrative and not a limiting sense.

What is claimed is:

1. A signal control system operatively connected to receive a selection signal and including a channel counter, comprising:

a time-division speech network having a backward side, having speech paths and having highway outputs operatively connected to the speech paths for outputting an input signal on the backward side of said time division speech network;

time switches, each having an input, each operatively connected to the channel counter, each having a speech memory including addressable memory cells, each reading out speech information from the memory cell of the speech memory in the order of the memory cell address determined by the output of the channel counter; and a digital pad switch operatively connected to receive the selection signal, operatively connected between one of the respective highway outputs and the speech memory of one of said time switches, for sending out, under the control of the selection signal, a selected one of converted input signals that correspond to an input signal received from the one of the highway outputs, the converted input signals respectively attenuated in comparison with the input signal by predetermined amounts, the converted input signals including a zero level converted signal that can be selected regardless of the presence of the input signal, when said time division speech network cuts off the speech path set up in said time-division speech network, said digital pad switch controlled so that the zero level converted signal is output, so that the zero level signal is written into the speech memory of said time switches, so that one of said time switch outputs a time switch signal corresponding to a zero level.

2. A signal control system including a channel counter and a continuous tone signal generator for generating a continuous tone signal, and operatively connected to receive a selection signal, comprising:

a time-division speech network having an input operatively connected to the continuous tone signal generator, having highway outputs for outputting an input signal, and having a speech path operatively connected between the input and one of the highway outputs;

time switches, each having an input, each operatively connected to the channel counter, each having a speech memory including addressable memory cells each reading out speech information from the memory cells of the speech memory in the order of the memory cell address determined by the output of the channel counter; and a digital path switch, operatively connected to receive the selection signal, operatively connected between one of the highway output and one of said time switches and, for sending out, under the control of the selection signal a selected one of converted input signals that correspond to the input signal received from the one of the highway outputs, the converted input signals respectively attenuated in comparison with the input signal by predetermined amounts, the converted input signals including a zero level converted signal corresponding to an infinitely great attenuation of the input signal that can be selected regardless of the presence of the input signal, said digital pad switch controlled by the selection signal so that said digital pad switch repeatedly and alternately sends out the zero level converted signal for a predetermined period of time and the input signal for the predetermined period of time, so that the continuous tone signal output by the continuous tone signal generator connected to the input of said time-division speech network reaches the one of the highway outputs thereof by the speech path thereof, thereby turning ON and OFF the tone signal.

3. A signal control system, operatively connected to receive a selection signal, including a channel counter and a continuous tone signal generator for generating a continuous tone signal, comprising:

a time-division speech network having an input operatively connected to the continuous tone signal generator, having highway outputs for outputting an input signal and having a speech path operatively connecting the input to one of the highway outputs;

time switches each having an input, each operatively connected to the channel counter, each having a speech memory including addressable memory cells, each reading out speech information from the memory cells of the speech memory in the order of the memory cell address determined by the output from the channel counter; and a digital pad switch, operatively connected between the one of the highway outputs and one of said time switches, for sending out, under the control of the selection signal, a selected one of converted input signals that correspond to the input signal received from the one of the highway outputs, the converted input signals respectively attenuated in comparison with the input signal by predetermined amounts, whereby the digital pad switch controlled so that the continuous tone signal output by the continuous tone signal generator connected to the input of said time-division speech network reaches the one of the highway outputs thereof by the speech path thereof and is attenuated by said digital pad switch in a stairstep manner.

4. A signal control system according to claim 3, wherein a howler tone generator of a constant level is operatively connected, as the continuous tone signal generator, to the input of said time-division speech network, for generating a howler tone signal, wherein said digital pad switch attenuates the howler tone signal output by the howler tone generator to the speech path of said time-division speech network and thereby to the one of the highway outputs in a stairstep manner in dependance upon the selection signal.

5. A signal control system according to claim 3, wherein said time switches each have an output, wherein a multi-frequency signal transmitter for sending out a multi-frequency signal of a constant level is operatively connected to the input of said time-division speech network, wherein a multi-frequency signal receiver is operatively connected to the output the of one of said time switches, said multi-frequency signal transmitter is operatively connected to the multi-frequency receiver by connections through the speech path, the one of the highway outputs of said time-division speech network, said digital pad switch and the one of said time switches, so that the multi-frequency signal passing through said digital pad switch is attenuated in a stairstep manner by controlling said digital pad switch with the selection signal, thereby generating a testing signal for testing the receiving sensitivity of said multi-frequency signal receiver.

6. A signal control system comprising:
a tone signal generator for generating a continuous tone signal;
a time-division speech network, having an input operatively connected to said tone signal generator and having an output, for connecting said tone signal generator to the output of said time-division speech network;
attenuation means, operatively connected to the output of said time division speech network, for varying the attenuation of the continuous tone signal; and
a time switch, operatively connected to said attenuation means, for storing the output of said attenuation means.

7. A signal control system as recited in claim 6, wherein said attenuation means comprises a digital multiplying system, including a digital multiplier, wherein the continuous tone signal is multiplied in said digital multiplier by a coefficient used for attenuating the continuous tone signal by a predetermined amount.

8. A signal control system comprising:
a tone signal generator for generating a continuous tone signal;
a time-division speech network, having an input operatively connected to said tone signal generator and having an output, for passing therethrough the continuous tone signal;
attenuation means, operatively connected to the output of said time-division speech network, for varying the attenuation of the continuous tone signal by converting the continuous tone signal into a converted continuous tone signal; and
a time switch, operatively connected to said attenuation means to receive the converted continuous tone signal, for storing the converted continuous tone signal.

9. A signal control system as recited in claim 8, wherein the continuous tone signal and the converted continuous tone signal are digital signals.

10. A signal control system as recited in claim 9, wherein said means for varying the attenuation of the continuous tone signal comprises a digital pad switch.

11. A signal control system as recited in claim 10, wherein said digital pad switch comprises:
read only memory devices, each having an input operatively connected to said time division speech network to receive the continuous tone signal, each having an output, each having stored therein an attenuated digital signal that corresponds to the continuous tone signal, and each for outputting the attenuated digital signal upon receipt of the continuous tone signal;
a pad switch memory, having memory cells each storing a selection signal, for outputting one of the selection signals; and
a selector, operatively connected to said read only memory devices and to said pad switch memory, responsive to one of the selection signals, for selecting one of the attenuated digital signals, and for outputting one of the attenuated digital signals as the converted continuous tone signal.

12. A signal control system as recited in claim 10 comprising:
a pad switch memory having memory cells each storing a selection signal;
combining means, operatively connected to said time division speech network to receive the continuous tone signal and operatively connected to said pad switch memory, for combining the selection signal and the continuous tone signal; and
a read only memory device, having an input operatively connected to said combining means to receive the combined selection signal and continuous tone signal, having memory cells each storing an attenuated digital signals, for outputting one of the attenuated digital signals as the converted continuous tone signal when the combined selection signal and continuous tone signal is received.

13. A signal control system as recited in claim 11 or 12, wherein one of the attenuated digital signals corresponds to a zero level signal, wherein when the time-division speech network blocks the continuous tone signal said digital pad switch outputs the zero level signal as the converted continuous tone signal, so that the continuous tone signal is no longer stored in said time switch.

14. A signal control system as recited in claim 13, wherein said zero level signal corresponds to an infinite attenuation, wherein another one of the attenuated digital signals is the continuous tone signal, wherein said digital pad switch repeatedly and alternatively outputs the zero level signal and the attenuated digital signal which is equal to the continuous tone signal, as the converted continuous tone signal, so that said time switch memory alternately stores the continuous tone signal and the zero level signal.

15. A signal control system as recited in claim 14, wherein the attenuated signals correspond to the continuous tone signal attenuated by predetermined amounts, and wherein said digital pad switch outputs the converted tone signal so that a stairstep signal is generated.

16. A signal control system as recited in claim 15, wherein said tone signal generator is a howler tone generator.

17. A signal control system as recited in claim 15, wherein said time switch has an output, wherein said tone signal generator is a multi-frequency signal transmitter, said signal control system further comprising a multi-frequency signal receiver operatively connected to the output of said time switch, wherein the stairstep signal is used as a testing signal for testing the receiving sensitivity of said multi-frequency signal receiver.

* * * * *

UNITED STATES PATENT AND TRADEMARK OFFICE
CERTIFICATE OF CORRECTION

PATENT NO. : 4,380,064

DATED : April 12, 1983

INVENTOR(S) : HIROSHI ISHIKAWA ET AL

It is certified that error appears in the above-identified patent and that said Letters Patent is hereby corrected as shown below:

Front page, [57] ABSTRACT, Col. 2, line 3, after "compared", insert --to--.

Col. 1, line 24, ";" should be --,--;
line 27, "etc" should be --etc.--.

Col. 2, line 22, ""0,"" should be --"0"--.

Col. 7, line 40, "ROM" should be --$ROM_\infty$--;
line 43, "on-off" should be --ON-OFF--;
line 49, "fn" should be --in--.

Col. 8, line 6, "form" should be --from--.

Signed and Sealed this

Twenty-ninth Day of November 1983

[SEAL]

Attest:

GERALD J. MOSSINGHOFF

Attesting Officer     Commissioner of Patents and Trademarks